(12) United States Patent  
Cross et al.

(10) Patent No.: US 7,493,374 B2  
(45) Date of Patent: Feb. 17, 2009

(54) SYSTEM PERIODICALLY RETRIEVING AND PROCESSING INFORMATION FROM MULTIPLE NETWORK ACCOUNTS AND PRESENTING TO USER THROUGH A COMMON ACCOUNT

(75) Inventors: Paul Cross, Abbotsford (CA); Marvin Sanderson, Abbotsford (CA)

(73) Assignee: Oyco Systems, Inc., Vancouver (CA)

( * ) Notice: Subject to any disclaimer, the term of this patent is extended or adjusted under 35 U.S.C. 154(b) by 293 days.

(21) Appl. No.: 11/470,981

(22) Filed: Sep. 7, 2006

(65) Prior Publication Data

US 2008/0172459 A1    Jul. 17, 2008

(51) Int. Cl.  
*G06F 15/16* (2006.01)

(52) U.S. Cl. .................. 709/219; 709/217; 709/216

(58) Field of Classification Search .................. 709/206, 709/213, 214, 215, 216, 217, 218, 219; 705/2, 705/3, 35; 713/201  
See application file for complete search history.

(56) References Cited

U.S. PATENT DOCUMENTS

| | | | | |
|---|---|---|---|---|
| 2001/0027478 A1* | 10/2001 | Meier et al. | .................. | 709/206 |
| 2004/0205011 A1* | 10/2004 | Northington et al. | .......... | 705/35 |
| 2005/0060572 A1* | 3/2005 | Kung et al. | .................. | 713/201 |
| 2005/0288967 A1* | 12/2005 | Zammit | ......................... | 705/3 |
| 2006/0149595 A1* | 7/2006 | Williams et al. | ............... | 705/2 |

* cited by examiner

*Primary Examiner*—Le Luu  
(74) *Attorney, Agent, or Firm*—Fasken Martineau DuMoulin LLP

(57) ABSTRACT

The invention provides a system and method for managing account information and website information for a user having at least one messaging account. The system comprises: an account management module, a central message processing module and a message retrieval module. The account management module establishes an account for the user, the account having an account name based on a telephone number associated with the user; associates the account with all messaging accounts; and stores all required access information for all messaging accounts. The central message processing module collects, stores and presents information regarding messages processed by the all messaging accounts. The message retrieval module periodically and automatically accesses all messaging accounts, retrieves any messages being sent to the accounts and forwards the any message to the central communication processing module in the system.

7 Claims, 9 Drawing Sheets

SYSTEM PERIODICALLY RETRIEVING AND PROCESSING INFORMATION FROM MULTIPLE NETWORK ACCOUNTS AND PRESENTING TO USER THROUGH A COMMON ACCOUNT

FIELD OF THE INVENTION

The present invention relates to a system and method for processing multiple accounts for emails, text messaging, voice mails, database search engines, through a central account manager, using a universal account name for the users.

BACKGROUND

The internet provides a widely distributed, generally easily accessible network for users in different organizations and at different geographic locations to communicate with each other. As is known, the network provides communications such as email messages, text messages (including SMS messages), centralized servers hosting services such as web sites, ftp sites and others. As different services are provided and connected to the internet, invariably, each service establishes a separate account and access point for its users. A person can be a user of several services, each potentially having their own account names, login codes and passwords. Tracking all of these accounts and their passwords can be cumbersome.

There is a need for a system and method which addresses the deficiencies in the art.

SUMMARY

In a first aspect, a system for managing account information and website information for a user having at least one messaging account is provided. The system comprises: an account management module, a central message processing module and a message retrieval module. The account management module establishes an account for the user, the account having an account name based on a telephone number associated with the user; associates the account with all messaging accounts; and stores all required access information for all messaging accounts. The central message processing module collects, stores and presents information regarding messages processed by the all messaging accounts. The message retrieval module periodically and automatically accesses all messaging accounts, retrieves any messages being sent to the accounts and forwards the any message to the central communication processing module in the system.

In the system, the central message processing module may forward messages from one type of messaging account to another type of messaging account.

In the system, the central message processing module may create and send a response message in response to received messages, the response message may contain sender information relating to either the account or a destination account associated with the received message.

The system may further comprise a public web site formatting module for presenting a web site utilizing content provided by the user, wherein the public web site has an address associated with the account name.

The system may further comprise a favorites web site module for centrally storing preferred access information for a preferred web site provided by the user and presenting information regarding the preferred web site in a GUI to the user.

In a second aspect, a method for a managing at least one messaging account for a user through a central account is provided. The method comprises: storing access information for all messaging accounts associated with the user; associating all messaging accounts with a single account for the user; periodically and automatically accessing each messaging account utilizing the access information to retrieve any messages being sent to any messaging account; and forwarding the any messages to the central messaging processing module associated with the single account. In the method, the single account has an account name associated with a telephone number associated with the user.

The method may further comprise providing access to a public web site utilizing contents provided by the user, wherein the public web site has an address associated with the account name of the user.

In other aspects various combinations of sets and subsets of the above aspects are provided.

BRIEF DESCRIPTION OF THE DRAWINGS

The foregoing and other aspects of the invention will become more apparent from the following description of specific embodiments thereof and the accompanying drawings which illustrate by way of example only the principles of the invention. In the drawings where like elements feature like reference numerals (and wherein individual elements bear unique alphabetical suffixes).

DETAILED DESCRIPTION

Figure 1:
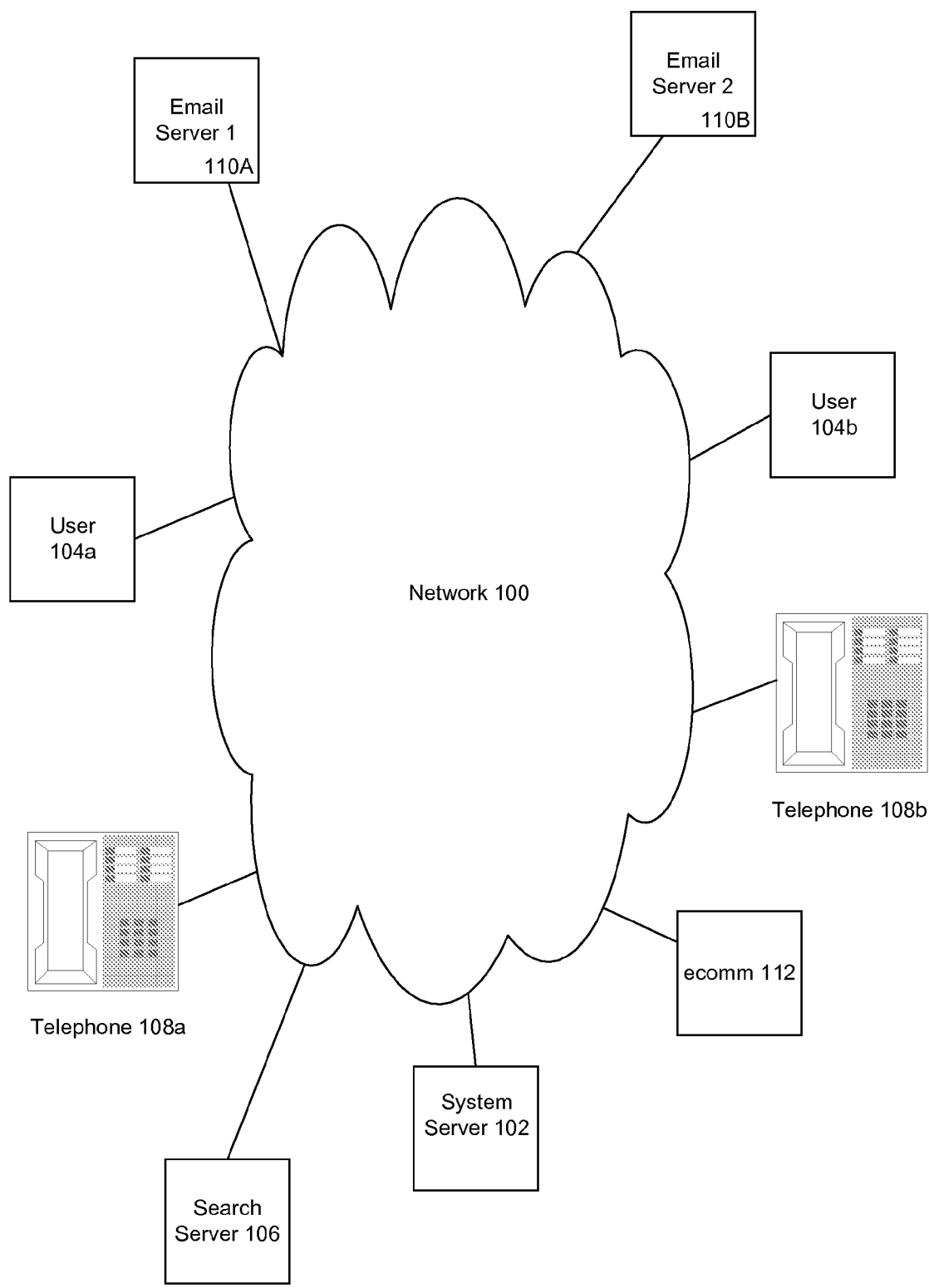
FIG. 1 is a block diagram of a system server of an embodiment connected to a communication network, a plurality of email servers, a search server and server hosts for web sites.

The description which follows, and the embodiments described therein are provided by way of illustration of an example or examples of particular embodiments of the principles of the present invention. These examples are provided for the purposes of explanation and not limitation of those principles and of the invention. In the description which follows, like parts are marked throughout the specification and the drawings with the same respective reference numerals.

Referring to FIG. 1, a schematic of network 100 is shown. Network 100 provides a system for connecting elements to other elements through its connections and communication protocols. Network 100 utilizes the internet protocol as a common communication protocol. Server 102 incorporating an embodiment may be connected to network 100, thereby allowing users at computers 104a and 104b, search server 106 network-connected telephones 108a and 108b, email servers 110a and 110b to communicate with server 102 and exchange messages therewith. System server 102 is embodied in a computer-based machine capable of storing and executing computer-based instructions (such as software and/or firmware) which is stored on a data storage system (not shown) associated with server 102. General computer components and network connection components known in the art can be used to form the basic hardware elements of server 102. As such a user of computer 104 can access server 102, which will then transmit and generate messages and GUIs to computer 104 as the user accesses the software of system server 102.

Computers 104a and 104b provide a link to network 100 for their users. Each computer 104 may be configured with appropriate software to provide separate access to one or more other entities connected to network 100. Each computer 104 may be implemented as any form of network-compatible computing device and may include a desktop computer, a laptop computer, a personal digital assistant (PDA) with appropriate messaging technologies, a cellular phone, or a portable email-enabled device.

Email servers 110a and 110b each provide email accounts and servers for email for their users. Email is one known format of electronic messaging. Email servers 110 may utilize known email server technologies known in the art to generate, send and receive email messages and can be implemented on known computer and server systems and software. As is known in the art, each server 110 may be associated with a specific email "host" name. Each identifiable user having an email account on the host will be provided with a specific user name associated with the account. Typically, the user name will be a combination of the first name (or first initials) and the last name of the user. As a sub-field, the name of the user can be delimited by a ".". As such, if Tom Jones has an email account with the email host "email.com", his fall email address may be tomjones@email.com, tom.jones@email.com, tjones@email.com, jonestom@email.com, or any other variant on his name. Alternatively, he may be assigned a name having little to do with his given name. He may also have more than one account on a server 110, with each account having a different user name.

For security reasons, each attempt to access an account on a server is presented with an initial signon screen. The signon screen generally invites the user validate his access by entering his email account and then providing a password. The entered password is compared against an expected password stored by the system on server 110. If the entered password matches the expected password, then the user is provided with access to his email account. At that time, the user can retrieve email messages, reviewed received messages and generate and send new messages. Alternatively, biometric readers may be incorporated to capture and compare biometric information (e.g. images of fingerprints) of a user to provide access to the system.

Generally, each email server 110 is configured to send its messages using Simple Mail Transfer Protocol (SMTP) as the transmission protocol. Generally, each email server comprises a standalone computer system having a dedicated connection to network 100 and a large storage system for storing and retrieving email messages and attachments processed by the email system for its users.

SMTP is a text-based protocol, where messages are pushed to the recipients. In the protocol, after one or more recipients of a message are specified, the message text is transmitted. Generally, the existence of the recipient is verified prior to any transmission of the message text. Other older systems may utilize UUCP-based connections. Generally, email servers 110 use an SMTP connection if both the sending and receiving servers are connected to the network all the time. A notable system using SMTP is the Microsoft Exchange Server (trade-mark of Microsoft Corporation).

In order for a user of an email account to receive his email messages at his computer 104, the computer must actively access the server 110 for any emails relating to the account. For internet email accounts, Post Office Protocol version 3 (POP3) is a frequently-used application layer internet standard protocol used to retrieve emails from servers 110. POP3 and its predecessors allow end users at computers 104 with intermittent connections such as dial-up connections to retrieve email when connected, and then to view and manipulate the retrieved messages without needing to stay connected. Data traffic can be encrypted through a SSL. A POP3 connection operates over a TCP/IP connection using network port number "110" on the corresponding computer.

Alternatively, computer 104 may use an IMAP email retrieval protocol which supports both connected and disconnected modes of operation. As such, email clients using IMAP can leave messages on the server 110 until the user explicitly deletes them. This feature allows multiple clients to access the same mailbox.

Currently, most email clients can be configured to use either POP3 or IMAP to retrieve messages; however, ISP support for IMAP is not as common.

Search server 106 maintains a web site and a database (not shown). User of computers 104 can access search server 106 and provide queries through its GUI. Once the query is entered, search server 106 parses the query and then submits the parsed query to its database. When the results of the query are returned, they are presented to the user on his computer in a GUI. Search server 106 may provide restricted access to its site(s) by requiring each user to have an account. Alternatively, less or no restrictions can be placed on access. Although one search server 106 is shown, additional servers 106 may be established and connected to network 100. Exemplary search servers include Google (trade-mark) and Yahoo (trade-mark).

E-commerce server 112 maintains a web site and a database (not shown) allowing a user to search for products or services offered by or through it. User of computers 104 can access e-commerce server 112 and search and select available merchandise through its GUI. Once any products or services are selected, e-commerce server 112 processes the order, its payment provisions, its delivery provisions, general account matters and any other issues or features. E-commerce server 112 may provide restricted access to its site(s) by requiring each user to have an account. Alternatively, less or no restrictions can be placed on access. Although one e-commerce server 112 is shown, additional servers 112 may be established and connected to network 100. Exemplary e-commerce sites include e-bay.com (trade-mark) and amazon.com (trade-mark).

Telephones 108 are connected either directly or indirectly to network 100. For example, telephone 108a may have internet connectivity built-in or may plug in to a suitable computer 104; also telephone 108b may be a wireless device which has internet capabilities built-in. As such, users of an appropriately-equipped telephone 108 can connect to network 100 and access the systems connected to it, as enabled by the particular telephone 108.

It will be appreciated that a user of services of the various email servers 110, telephone devices 108, search servers 106 and e-commerce servers 112 will have a plurality of accounts, emails addresses and passwords associated with each account. The embodiment provides a single global account which acts as an umbrella for all of its subordinate accounts (e.g. email accounts, voicemail accounts, SMS accounts, other electronic messaging accounts, web site access accounts, etc.). As such, emails from different email accounts are gathered, collected, presented and organized through a single interface. Further, the preferences of the users are stored in an account which is accessed through system 102. As such, where-ever a user sign's onto his account, the preferences for his views will be retrieved from the data kept by system 102, thereby providing a consistent "look and feel" for the user. The embodiment also provides a linked public web site for the user, using his account name as part of the address.

Figure 2:
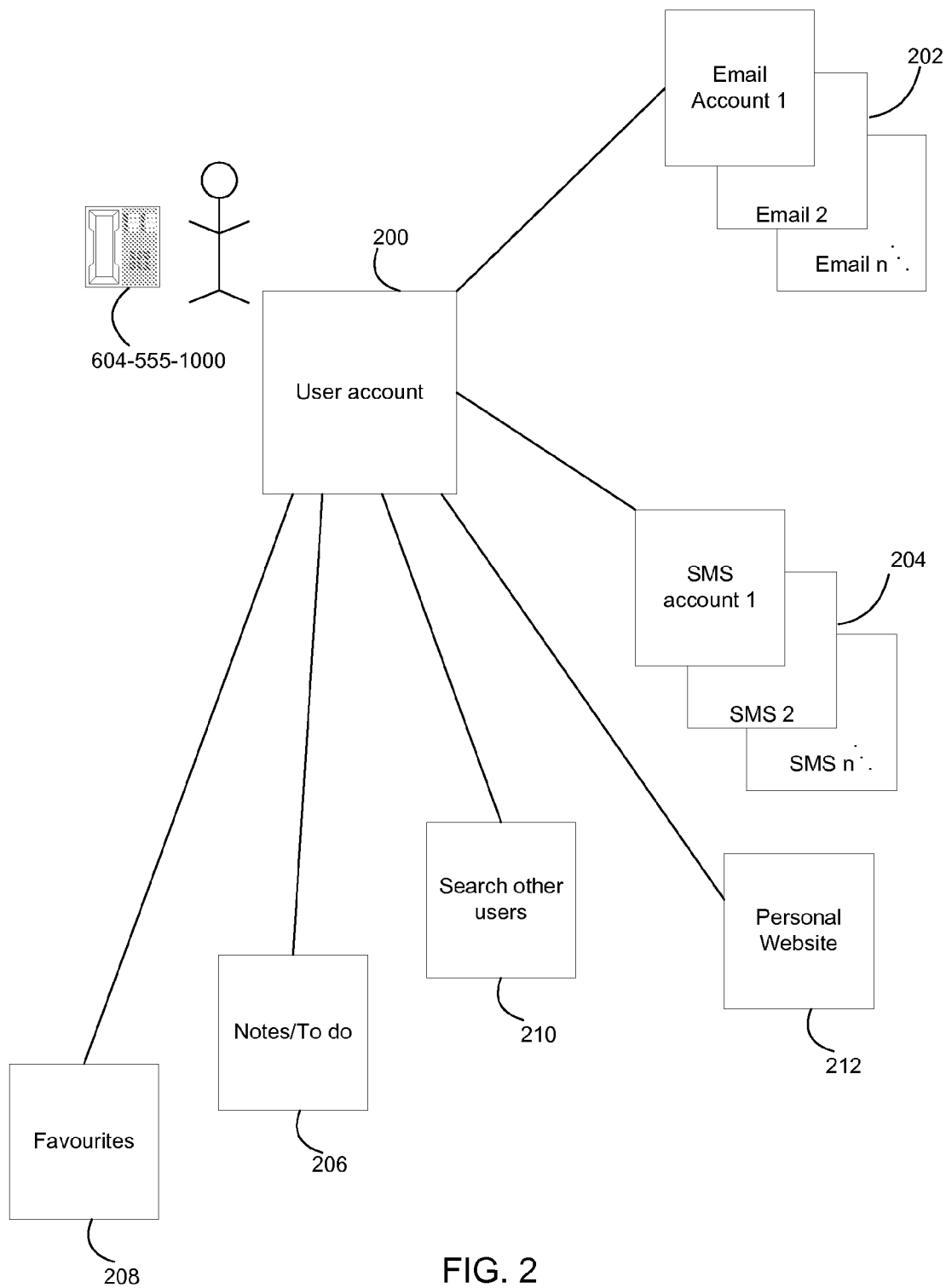
FIG. 2 is a block diagram various accounts and processes managed by a user account administered by system server of FIG. 1.

Referring to FIG. 2, notable features of an embodiment are illustrated by an account managed by system 102. In particular, single account 200 provides access to: multiple messaging accounts (such as email accounts 202, voice mail accounts, etc.), multiple communication processes (such as instant messaging, text messaging, SMS processes 204 etc.), multiple tasks 206 (e.g. maintenance of to do lists), multiple favorite web sites 208, user searches 210 and a personal web site 212.

Further, notably for email accounts 202, user account 200 provides a unique, but universally known format, for defining the address of the account for the user. As noted earlier, previous accounts for internet servers utilize some combination of the user's first name and last name. As there are many different combinations of presenting the first names, initials of first names and the last names of the users, user names for system 102 preferably use an unique, but easily recognized, account name. To that end, account 200 is set up so that the user utilizes his telephone number as his account name. As such, if the user's home landline telephone number is (604) 555-1000, comprising "604" for the area code, "555" for the exchange and "1000" for the extension. In other embodiments, the area code may be prefixed by the telephone country code associated with the number. As such, the embodiment will set his account name for account 200 to be: 6045551000@email.com. Alternatively, the user may utilize his cellular telephone number for his account. Variations may be used on the format of the account. For example, "." may be used to separate the area code portion from the exchange portion and the extension portion from the exchange portion. Alternatively, other punctuation marks (e.g. { },[ ], ( ), *, #, -, etc.) may be used to separate the portions as allowed by conventions in email addresses. It will be appreciated that using a known form of a known telephone number provides a unique, known and distinctive account address. In other embodiments, a portion of the telephone number (e.g. the area code), may be incorporated into the domain name portion of the account. In other embodiments, other unique and easily recognizable signatures may be used for the account names.

As such, using a user's telephone number, both the user and potential communicators with the user can generate the correct account information for the user, without relying on the possible combinations of strictly name-based accounts. As such, communicators can quickly and accurately generate an address field for an email message for the user's account 200 in system 102 for correct processing and routing to the user. Security for the user's account is maintained by having any access to the user's account checked with a signon screen requiring the user to enter the user name (e.g. the telephone number) and a password in a signon GUI.

Figure 3:
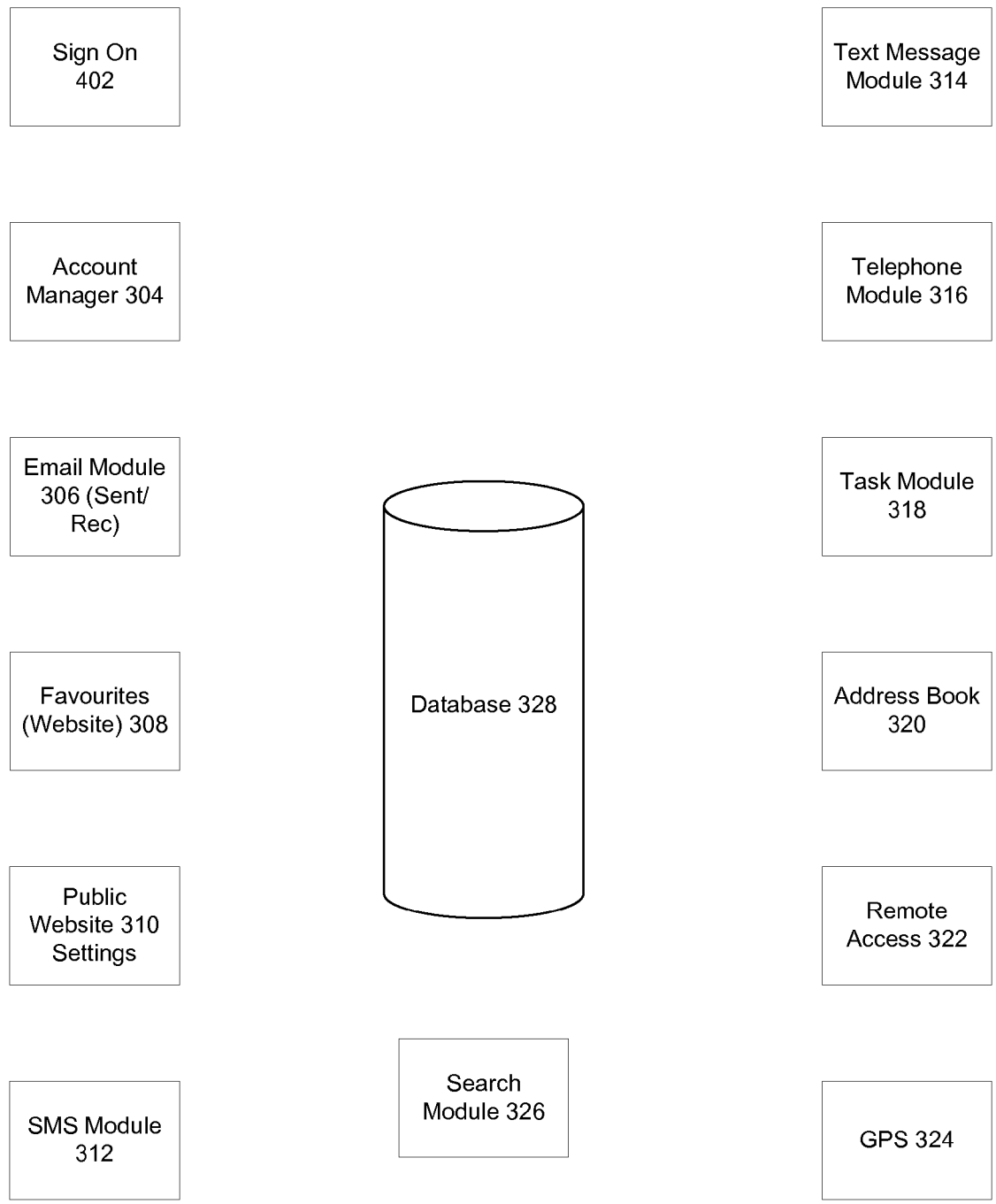
FIG. 3 is a block diagram of modules, including a signon module, an account manager module, an email account management module, a (web site) favorites module, a public web site maintenance module, an SMS interface module, a text messaging interface module, a telephone interface module, a task list module, an address book module, a remote access process module, a GPS module and a database for the system server of FIG. 1.

Referring to FIG. 3, further details of system 102 are provided. System 102 comprises the following modules, which are each incorporated into software and or firmware and operate on a processor (not shown) on system 102: signon module 302, account manager module 304, email account management module 306, (web sites) favorites processing module 308, settings module 310, SMS interface module 312, text messaging interface module 314, telephone interface module 316, task module 318, address book module 320, remote access process module 322, GPS module 324, search module 326 and database 328. In other embodiments, other modules can be provides as required. A brief description of each module is provided in turn.

Signon module 302 controls the GUIs generated on the user's local computer as he accesses server 102. The GUIs prompt the user to provide his telephone-number based account number and password. After the user has populated and activated the signon GUI, signon module compares the provided information against account information stored in database 328. If a match is found, then signon module 302 provides the user with access to the identified account and additional features as noted below. If a match is not found, the user may be asked to try again, or if too many incorrect signon attempts have been made, the session for the user may be terminated.

Account manager module 304 allows the user of change aspects associated with his account. The details of accessible accounts are stored in records in database 328 associated with the user's account. As such, for example, for each email account associated with the user, his account name, password and email access parameters (e.g. POP3 address) may be stored and modified as necessary. The user may also be allowed to change his password and allow visitors to access his account. Any changes made to any parameters are stored in the records associated with the account.

Email module 306 controls the sending and receiving of emails for the email accounts associated with the user's account. Further detail on the steps for tracking received emails and sending individual emails is provided later.

(Web site) favorites module 308 manages a list of favorite web sites as provided by the user through an GUI. Through a main input screen, the user may select a favorite web site, which is then spawned in a separate window on the user's computer. In other embodiments, the favorite web site may be spawned within a frame in the current GUI. The data for the favorite web sites (including the web site address, any signon information and its banner name for the GUI in server 102) are stored in database 328. As such, when a particular web site is accessed, if there are any signon parameters for it, they are automatically entered by module 308. No matter where user accesses system 102, he will always have access to a consistent set of favorites in a consistent GUI.

Public web site settings module 310 manages parameters, data and appearances for a public web site associated with the account. It provides a series of GUIs allowing parameters for the public web site to be viewed and changed. For the web site, different preset formats for the web site may be provided. The user is allowed to customize the public web site using personal picture files, personalized text and personalized links. All of the parameters are stored in database 328. Access to the public web site is not restricted, although in some embodiments, access restrictions may be provided. For the convenience of other users, the address for the web site is also derived from the telephone number of the user. As such, for the previous example, the user's public web site address could be expressed as: www.6015551000.email.com or alternatively www.email.com/6045551000. The personal web site may be used as a blog (web log) by the user. Generally, the public web site provides only information and links to other sites. In one embodiment, no information presented in the public web site can be modified by the visitor. In another embodiment, a visitor to the blog can add text to the site. The owner of the site can subsequently edit or remove the added text.

SMS module 312, processes incoming and outgoing SMS messages. As SMS messages have a shared address component with an email address or telephone number of the user, server 102 can pre-populate a message with sender identification when the user initiates the generation and sending of an SMS message. SMS module 312 accesses SMS and email account information from database 328. As such, SMS module can forward, redirect and copy SMS messages among accounts associated with the user. For example, when an SMS message is received, SMS module 312 will check the destination address for the message. It will also check for any re-direction instructions provided by the user for messages destined to the account. These re-direction instructions may be provided through an appropriate GUI on system 102. Similarly, when an SMS message is sent, the user may provide a separate forwarding instruction for the message. Again, the module 312 will check for any forwarding instructions provided by the user to module 312 and will react accordingly.

Similarly, text message module 314, processes incoming and outgoing text messages. As text messages have a shared address component with a telephone number of the user, server 102 can pre-populate a message with sender identification when the user initiates the generation, saving and sending of a text message.

Telephone module 316, processes incoming and outgoing telephonic calls. In particular, system 102 can be linked to a voice over IP telephone system, thereby allowing voice calls to be initiated and received from devices associated with other telephone numbers.

Task manager 318, processes and tracks scheduled tasks as provided by the user to system 102 through a GUI. As with known task managers, reminders can be flashed through an appropriate GUI to the user when a scheduled time for a task approaches.

Address book manager 320, processes and tracks contact information for the user for his account on system 102 through a GUI. As with known address book managers, GUIs are provided to update, add or delete information relating to contacts. Contact information is preferably stored in database 328.

Remote process 322 allows a user to remotely access an application through system 102. For example, a remote access application, such as a Citrix application (trade-mark) is provided on system 102. The remote application allows a user to signon to a remote computer, such as computer 104*b* and access its locally stored applications. As such, a word processor program stored and operating on computer 104*b* may be operated through system 102.

GPS module 324, processes and tracks location information for a user through a GUI.

Search module 326 provides a GUI allowing a user to search for other accounts maintained by system 102. As each user has an account name which is formatted as a unique, but known, telephone number, search module can process and track all accounts for its users using either the account name or the user name of the account holder. As such, a search engine is provided for module 326 which accepts search parameters for account users, as entered by the current user. The search parameters are provided through a GUI. Once the parameters are entered, the module 326 searches its account records, as stored in database 328 and provides the results of any matches. In one embodiment, before the results are posted to the user, there is an access flag on the matching result which is checked. The user of each account may set the access flag to "denied" which will then remove the entry from the search set.

Additionally, access may be provided to any video conference accounts associated with the user. A video conference module (not shown) processes video link requests and manages conferences as they are conducted. The module stores in database 328 all access information and connection information for all video accounts. If email messages are sent by the video conference site, a link may be established between email module 308 and the video conference module to forward any such emails received from the video conference web site to the video conference module for further processing.

It will be appreciated that database 328 centrally stores all pertinent information for system 102 for the modules as described. Each account will have a plurality of records associated with it, relating to administrative data for the account, personal information for the user, records of all email addresses, access information, passwords, POP3 addresses, web site preferences, SMS accounts and passwords, any cross-relationships between accounts, etc. As required, each module in system 102 can access one or more fields of the records of one or more account holders. The embodiment may use known database storage and retrieval techniques and processes known in the art.

Further, each module as described can be implemented in software or firmware using known programming languages. Communications among modules, as needed may be provided using messages, semaphores or the passing of variables, as appropriate.

Referring to FIGS. 2-8, further detail on selected modules of system 102 is provided by describing a typical session for a user as he accesses his account on system 102. Therein, exemplary GUIs are shown as being generated at certain points during the account session for the user. For the purposes of illustration, it is assumed that the user has successfully found the web site for system 102 and has successfully entered his account number (using his telephone number) and his password. When the user successfully signs on, system 102 accesses database 328 to obtain the account information for the user, the web site favorites and the setting for the public web site for the user.

Figure 4:
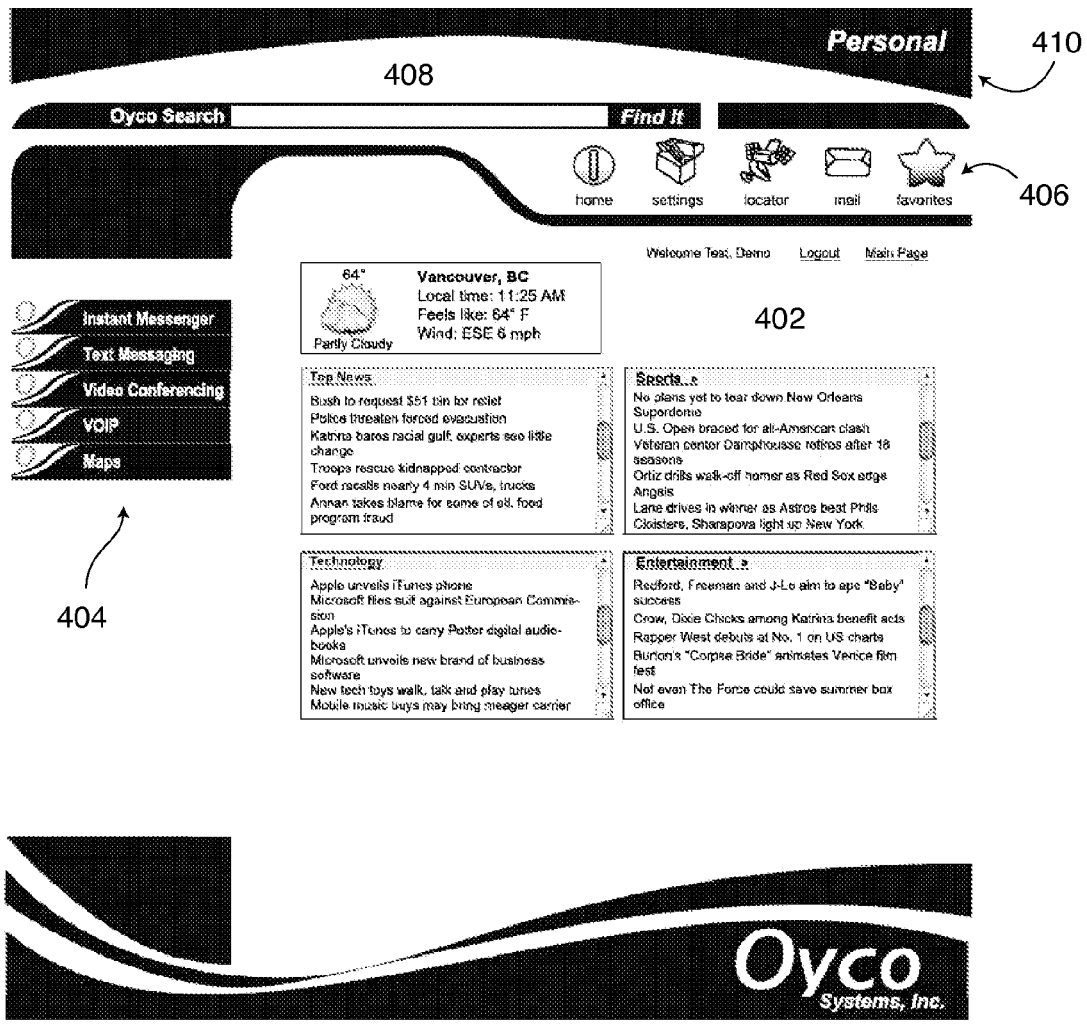
FIG. 4 is a snapshot of a GUI presented to a user of the system server of FIG. 3 after successful execution of the signon module by a user to access his account.

Specifically referring to FIG. 4, GUI 400 is shown which is produced by system 102 immediately after a successful signon by the user. GUI 400 has five basic regions: main region 402 is a large area where the notable data, text and graphics are generated for the particular application being executed. Option bar 406 provides a series of radio buttons providing quick access to the most frequently used modules in system 102. Option bar 406 provides radio buttons for: (web site) favorites, the address book, the email function, a GPS locator, a settings module and a home button. Additional radio button may be provided for other facilities, such as an internet radio station list, a notepad and a voice recorder. Option bar 404 provides a set of radio buttons relating to the activation of (telephone-related) processing modules, such as an instant message button, an SMS button, a phone forum, cellular services, GPS services and video conferencing services. Search bar 408 provides a dialog box and an activate button to provide a GUI for initiating an internet search through a preferred search engine, such as Google (trademark). Banner 410 provides some basic identification information for the user's account. In other GUIs, additional radio buttons may be provided to give the user the ability to select different default information in main screen 402.

In main screen 402, basic useful timely data and screens are provided to allow the user to keep up-to-date with current events, regardless of what activities need to be performed for his accounts. For example a RSS feed may be provided, giving the user a set of basic news, sports and weather information. As the user activates any of the buttons in bars 404 or 406, information from the associated modules may be presented either in screen 402 or in a separate window.

Figure 5:
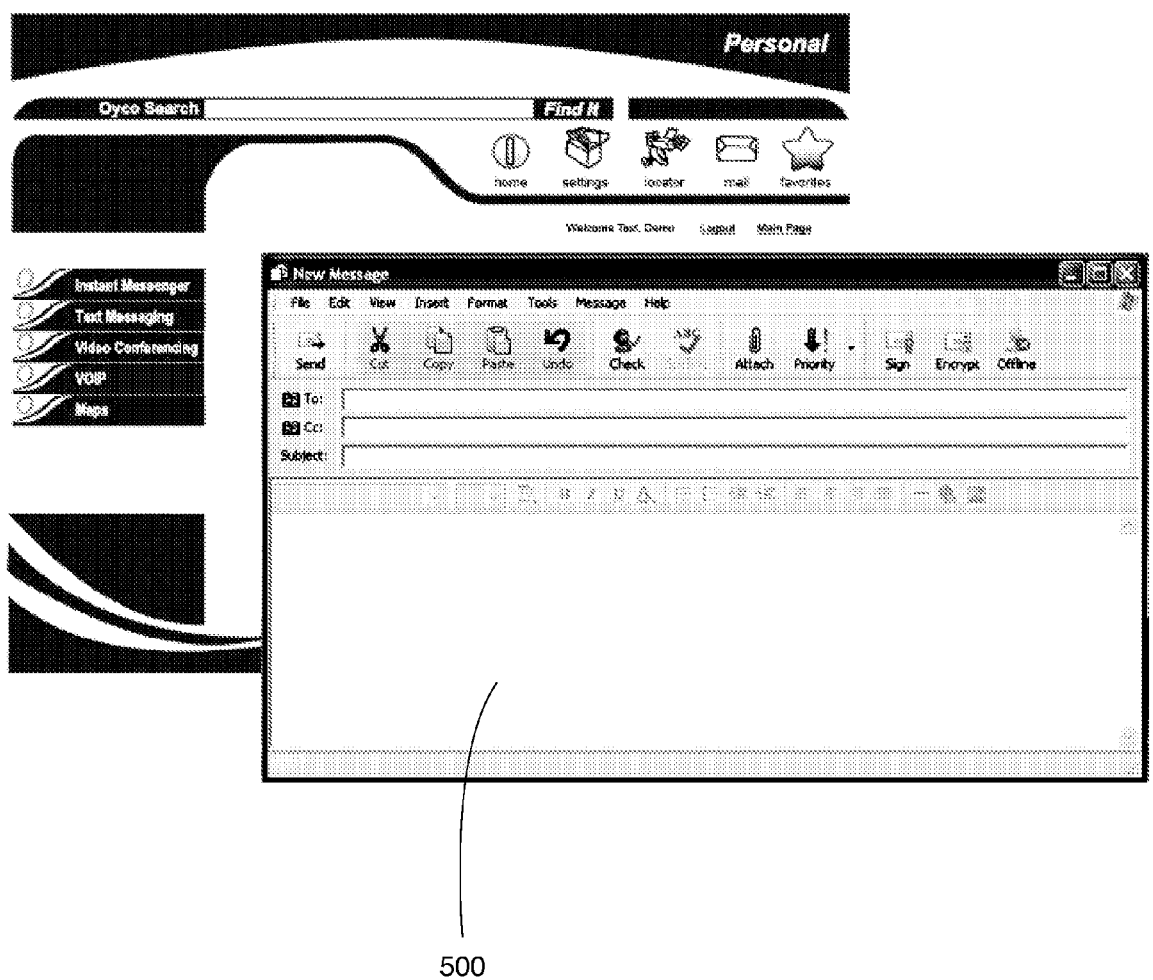
FIG. 5 is a snapshot of a GUI presented to a user of the system server of FIG. 3 after the user has successfully signed on to his account and after the user has activated the email button to activate the email account module.

Referring to FIG. 5, it is presumed that the user has activated the email button in bar 406, thereby activating email module 306. A separate signon process may be repeated for security purposes. When a new email is generated, a "generate and send" process in module 306 presents new message box 500 (not to scale). Typically, the new message is spawned in a new window. The user will complete the "TO", "CC", "Subject" and "body" sections of the email and when it is finished, he will activate the "send" command. The email is then formally composed and sent by email module 306 towards its intended recipient. Preferably, the "FROM" field for the email will be populated with the account information for the user.

For receiving emails, email module 306 operates as follows. As noted above, an account in system 102 provides a centralized system of tracking email accounts from one or more different email accounts. To accomplish this feature, as part of the account management process, the user provides to system 102 details of all necessary access parameters for all email accounts managed by system 102. This information includes: the full email account name; the full password for the account; the internet address of the account; and any additional addresses required to retrieve or send email (e.g. the POP address of the email account). The data can be provided by the user to system 102 through an appropriate GUI as an input screen. All the data is stored in database 328 maintained by system 102.

Once all the access parameters for all the accounts are entered, system 102 provides scripts which automatically periodically issue POP3 mail retrieval requests for each of the accounts listed in its database. As such, the user does not need to remember each account and separately retrieve emails from each account. For each account, the scripts includes a set of tailored POP3 commands which request that the server for the account download to the system 102 all of the recently received emails addressed to that account. The frequency of the execution of the scripts can be changed. In one embodiment, the scripts are executed to check for newly received emails every two to four minutes.

Once all of the emails from all of the accounts are retrieved, they are presented to the user in a single GUI through screen 402. Also, as an option, system 102 may generate an individual message to the account holder when a new message is received. In the embodiment, the collected emails are presented to the user of the system 102 account through a Microsoft Exchange server (trade-mark). As such, a set of different emails can be collected and presented to the user through one common interface.

Additional features are provided in the email module 306, where the emails can be filtered and filed into separate folders. As such, if required, the emails can be grouped and collected in folders which would mimic the separate accounts handled by system 102 for that user. For example, if a user named Jeffrey Smith had three accounts controlled by the single account at system 102, such as "jeff@emaill.com", "jeffsmith@work.com" and "j.smith@fun.com", then the email module 306 will individually scan and collect all received emails from each account and present all the emails to the user in a single GUI. If the user has established separate folders for each account, then the respective emails will be routed to the proper folders. The user can then open, examine, print and respond to each email, as appropriate. For any responses, the email module automatically populates the sender header information with the address information for the system account. Here the sender would be identified as "6045551000@email.com" in the email message. Alternatively, the sender may be identified by a more generic name, e.g. name@email.com, if the user wishes to keep the phone number private. In other embodiments, the email module 306 may selectively populate the sender information with information from one of the accounts controlled by system 102.

As an additional feature, email module 306 module can forward, redirect and copy email messages among other accounts, such as email enabled cellphone accounts, associated with the user. For example, when an email message is received, email module 306 will check for any re-direction instructions provided by the user for email messages destined to the account. These re-direction instructions may be provided through an appropriate GUI on system 102. Similarly, when an email message is sent, the user may provide a separate forwarding instruction for the message. Again, the module 306 will check for any forwarding instructions provided by the user to module 312 and will re-act accordingly.

Figure 6:
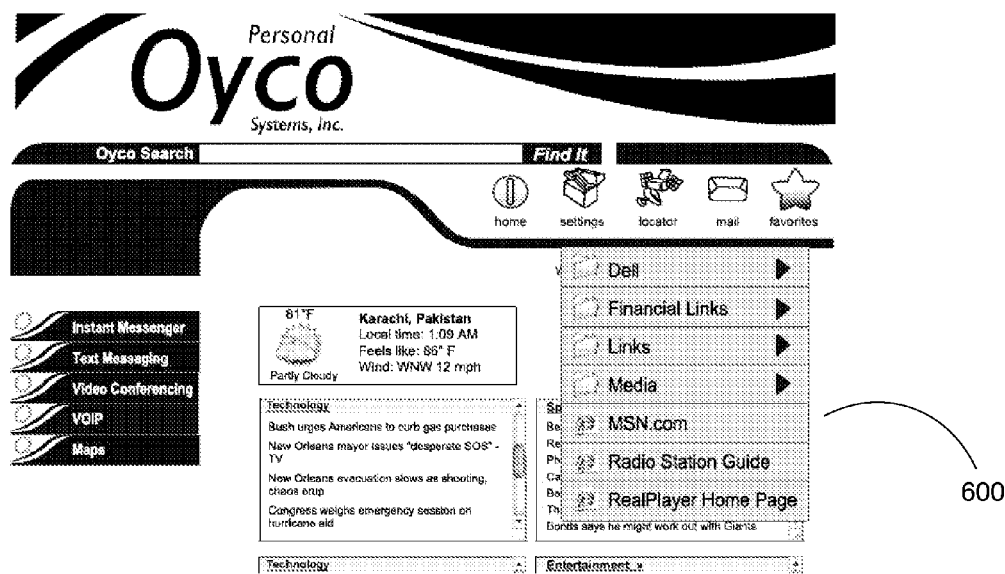
FIG. 6 is a snapshot of a GUI presented to a user of the system server of FIG. 3 after the user has successfully signed on to his account and after the user has activated the favorites button to activate the (web site) favorites module.

Referring to FIG. 6, it is presumed that the user has activated the (web site) favorites button in bar 406, thereby activating (web site) favorites module 308. From the button bar 406, a selection list of favorite web sites is provided in selection bar 600. The contents of the list can be modified through a selection GUI (not shown) where a web site address and its nickname can be provided. The selection list is populated with the contents of the list. When a favorite selection is made, the system spawns a new window with a link to the selected web site. As the data for the favorites is stored in database 328, the identification of the favorites is not dependent on the computer used by the user to access system 102.

Figure 7A:
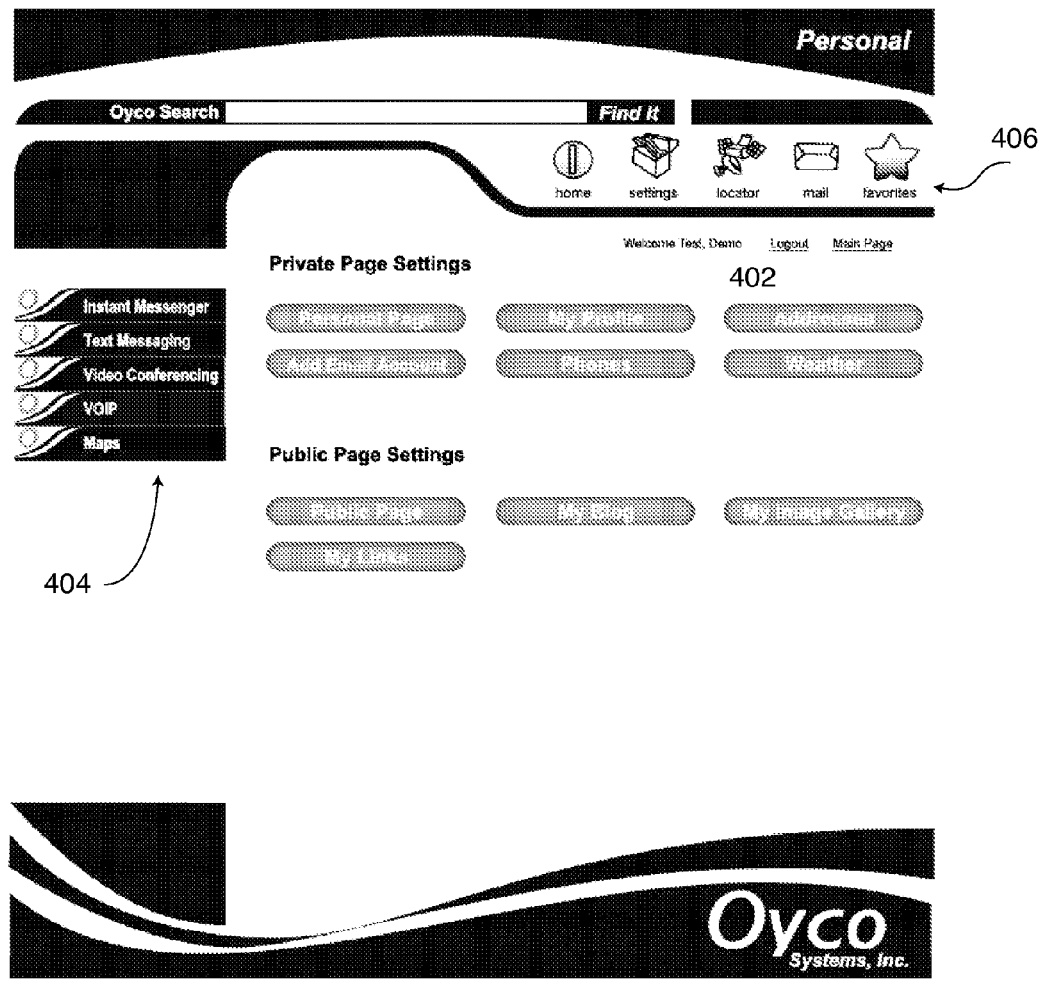
FIG. 7A is a snapshot of a GUI presented to a user of the system server of FIG. 3, after the user has successfully signed on to his account and after the user has activated the settings button.

Referring to FIG. 7A, it is presumed that the user has activated the settings button in bar 406, thereby activating account manager module 304. In section 402, a series of buttons are provided allowing the user to activate GUIs for setting modification modules. Settings can be changed for private page settings and public page settings. For the private page settings, parameters for the user's personal page, as he views it, the account profile, addresses, email accounts, phone numbers and weather location settings may be selected to be reviewed and modified. For the public page settings, parameters for the public web site associated with the account, the blog associated with the account and other publicly accessible sites and links can be viewed and modified.

Figure 7B:
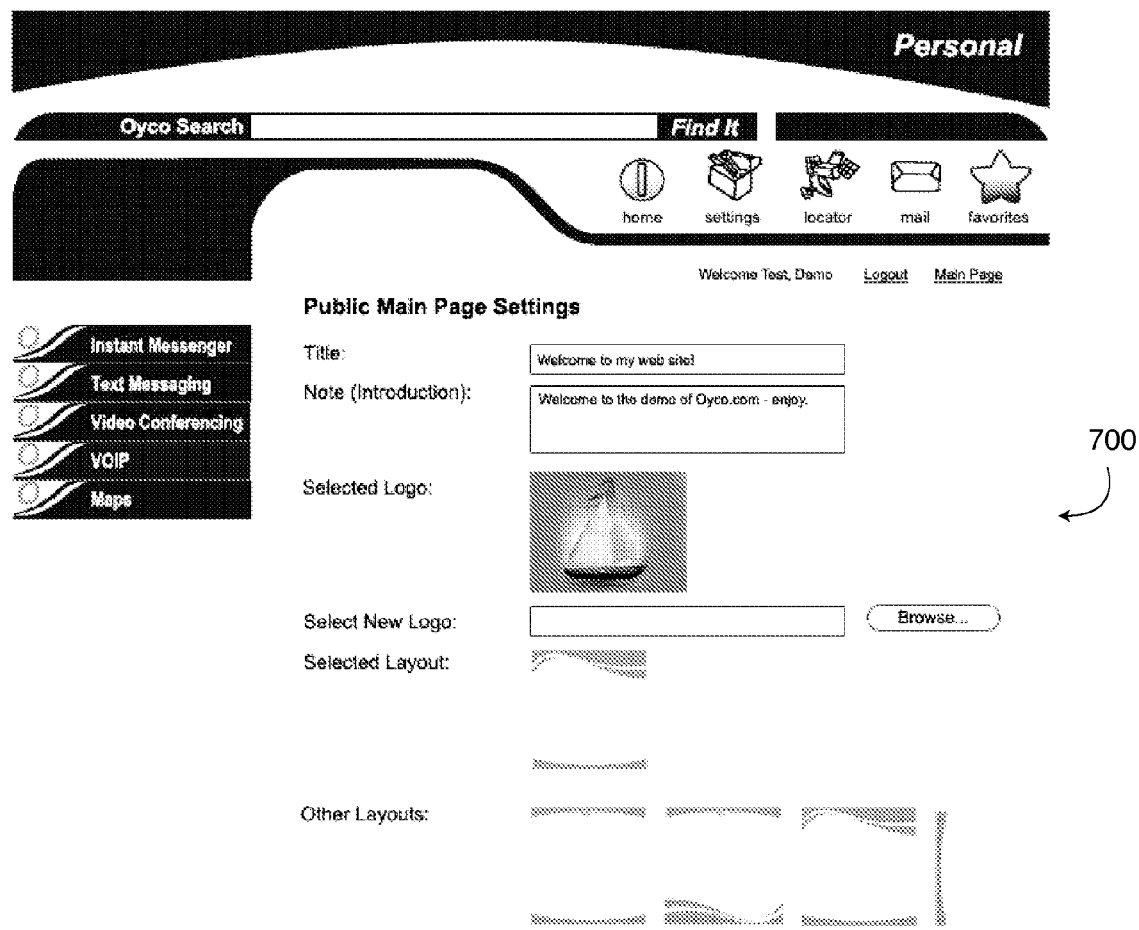
FIG. 7B is a snapshot of a GUI presented to a user of the system server of FIG. 3, after the user has successfully signed on to his account and after the user has activated the (web site) settings button for the public web site module.

Referring to FIG. 7B, it is presumed that the user has activated the change the public page button, thereby activating a public web site settings module 310. In section 700, a series of input bars and radio buttons are provided to give the user options on the presentation formats and contents of the public web site. As with many web sites, video, audio, graphics and text may be incorporated into the web site. Again, as the preferences are saved on database 328, the contents of the public web site (accessed through the user name of the account, e.g. "www.6015551000.email.com"), the user can modify the public web site from any computer accessing system 102 and the modifications will stay with the site.

Figure 8:
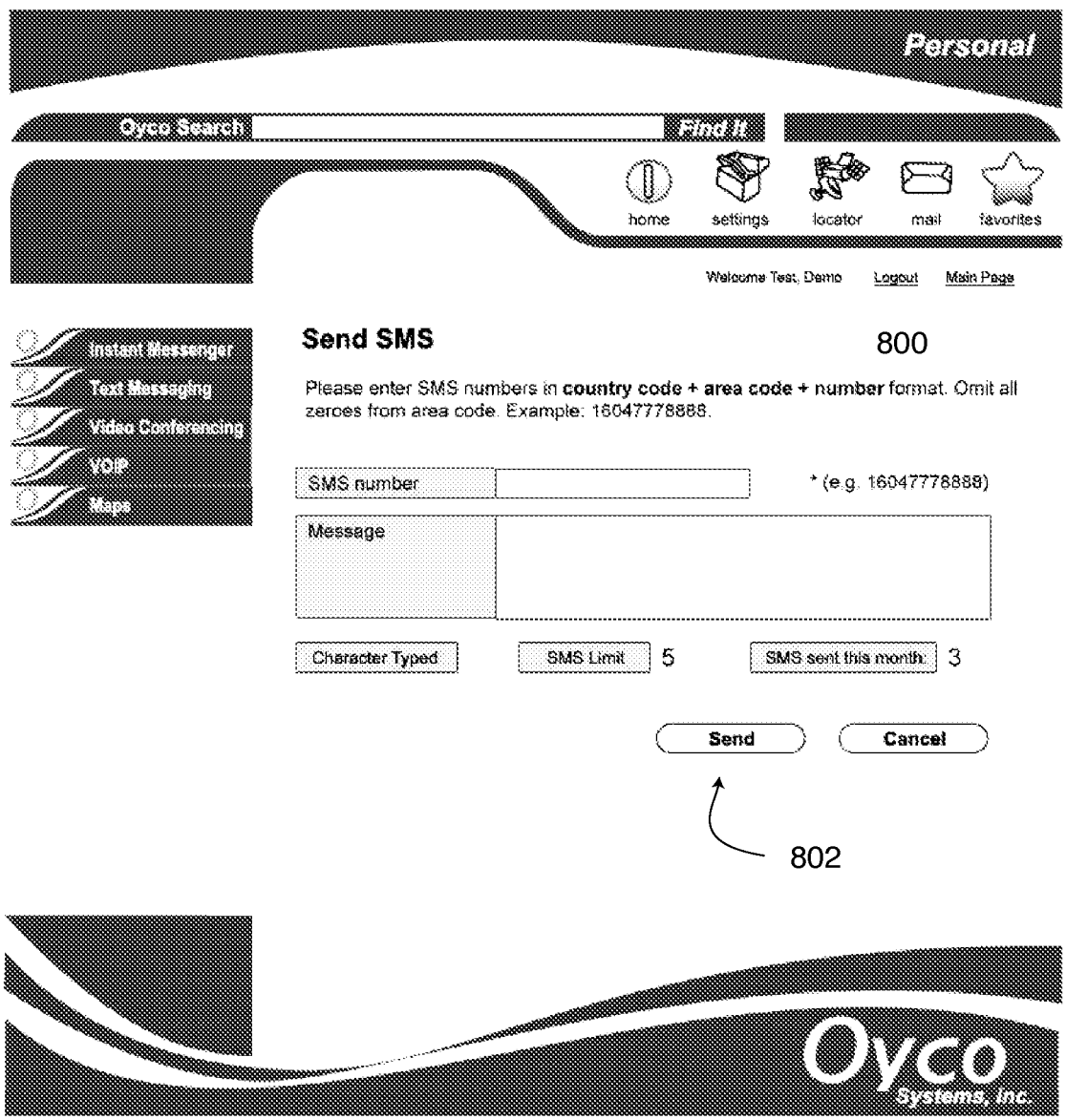
FIG. 8 is a snapshot of a GUI presented to a user of the system server of FIG. 3, after the user has successfully signed on to his account and after the user has activated the instant messaging button for the system server.

Referring to FIG. 8, it is presumed that the user has activated the SMS message button in bar 404, thereby activating SMS message module 312. In section 402, preset fields for the SMS message are shown in window 800. The data for the addressee may be provided by the data tracked by the address book module 320. As the SMS message is already associated with the user's email address or telephone number, that information may be pre-populated into the form. Once the contents of the form are correctly entered and the addressee is correctly entered, the user may send the message by engaging send button 802. A statistics module in module 312 tracks the number of SMS messages sent, received, the total number of characters sent and received, the percentage of successful message deliveries, etc. The statistics can be presented to the user through a GUI.

Execution of other applications through the common GUI is not shown, but can be understood to have similar processes, mutatis mutandis, as described above for other processes.

Although the invention has been described with reference to certain specific embodiments, various modifications thereof will be apparent to those skilled in the art without departing from the scope of the invention as outlined in the claims appended hereto.

We claim:

1. A system for managing account information and website information for a user having at least one messaging account, comprising
    an account management module for
        establishing an account for said user, said account having an account name based on a telephone number associated with said user;
        associating said account with said at least one messaging account; and
        storing all required access information for said at least one messaging account;
    a central message processing module for collecting, storing and presenting information regarding messages processed by said at least one messaging account; and
    a message retrieval module which periodically and automatically accesses said at least one messaging account, retrieves any messages being sent to said at least one messaging account and forwards said any message to said central communication processing module in said system.

2. The system for managing account information and website information as claimed in claim 1, wherein said central message processing module provides forwarding of messages from one type of messaging account to another type of messaging account.

3. The system for managing account information and website information as claimed in claim 2, wherein said central message processing module creates and sends a response message in response to received messages, said response message containing sender information relating to either said account or a destination account associated with said received message.

4. The system for managing account information and website information as claimed in claim 3, further comprising
    a public web site formatting module, for presenting a web site utilizing content by said account by said user, wherein said public web site has an address associated with the account name of said user.

5. The system for managing account information and website information as claimed in claim 4, further comprising
    a favorites web site module for centrally storing preferred access information for a preferred web site provided by said user and presenting information regarding said preferred web site in a GUI to said user.

6. A method for a managing at least one messaging account for a user through a central account, comprising
    storing access information for said at least one messaging account associated with said user;
    associating said at least one messaging account with a single account for said user;
    periodically and automatically accessing each account of said at least one messaging account utilizing said access information to retrieve any messages being sent to said at least one messaging account; and
    forwarding said any messages to said central messaging processing module associated with said single account, wherein said single account has an account name associated with a telephone number associated with said user.

7. The method for a managing a plurality of messaging accounts as claimed in claim 6, further comprising providing access to a public web site utilizing contents provided by said user, wherein said public web site has an address associated with the account name of said user.

* * * * *